US011579895B2

(12) United States Patent
Kosugi

(10) Patent No.: US 11,579,895 B2
(45) Date of Patent: Feb. 14, 2023

(54) CONTROLLING OPERATIONAL STATE OF AN ELECTRONIC APPARATUS BASED ON USER PROXIMITY AND USER INPUT

(71) Applicant: LENOVO (Singapore) PTE. LTD., New Tech Park (SG)

(72) Inventor: Kazuhiro Kosugi, Kanagawa (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 575 days.

(21) Appl. No.: 16/709,436

(22) Filed: Dec. 10, 2019

(65) Prior Publication Data

US 2020/0210206 A1    Jul. 2, 2020

(30) Foreign Application Priority Data

Dec. 27, 2018 (JP) .............................. JP2018-246034

(51) Int. Cl.
G06F 9/4401 (2018.01)
G06F 21/32 (2013.01)
G06F 9/445 (2018.01)

(52) U.S. Cl.
CPC ........ G06F 9/4418 (2013.01); G06F 9/44505 (2013.01); G06F 21/32 (2013.01)

(58) Field of Classification Search
CPC .................................................... G06F 9/4418
See application file for complete search history.

(56) References Cited

U.S. PATENT DOCUMENTS

2018/0278699 A1* 9/2018 Shin ...................... H04L 67/52

FOREIGN PATENT DOCUMENTS

| JP | 2003255922 A | 9/2003 |
| JP | 2016162312 A | 9/2016 |
| JP | 2018072750 A | 5/2018 |
| JP | 2018181293 A | 11/2018 |

\* cited by examiner

*Primary Examiner* — Gustavo Polo
(74) *Attorney, Agent, or Firm* — Kunzler Bean & Adamson; Bruce R. Needham

(57) ABSTRACT

An electronic apparatus includes processing unit configured to execute system processing, an object detection unit configured to detect an object present within a predetermined detection range, and an operation control unit configured to control the system processing according to a detection state detected by the object detection unit to make a transition to one of a first operating state and a second operating state in which at least part of the system processing is more limited than that in the first operating state. When a transition from the first operating state to the second operating state is made regardless of the detection state detected by the object detection unit, where the operation control unit prohibits the transition to the first operating state according to the detection state detected by the object detection unit.

20 Claims, 8 Drawing Sheets

CONTROLLING OPERATIONAL STATE OF AN ELECTRONIC APPARATUS BASED ON USER PROXIMITY AND USER INPUT

CROSS-REFERENCE TO RELATED APPLICATIONS

This patent application claims priority to Japanese Patent Application No. JP2018-246034 filed on Dec. 27, 2018 for Kazuhiro Kosugi, titled Electronic Apparatus, Control Method, and Program, the entire contents of which are incorporated herein by reference for all purposes.

FIELD

The subject matter disclosed herein relates to controlling operational state of an electronic apparatus and more particularly relates to controlling operational state of an electronic apparatus and limiting transition based on user input.

BACKGROUND

There is an electronic apparatus such as a PC (Personal Computer) which starts up when the approach of a person is detected and makes a transition to a standby state when the leave of the person is detected. As such an electronic apparatus, for example, a terminal processing device which displays an operation screen in response to detecting an approaching person is described in Japanese Patent Application Publication No. 2003-255922.

BRIEF SUMMARY

However, even when a user using an electronic apparatus puts the electronic apparatus in a standby state, for example, at the user's own discretion, the user may remain at the electronic apparatus. In this case, there is a concern that the approach of a person may be detected despite the fact that the electronic apparatus is put in the standby state at the user's own discretion to boot the electronic apparatus.

The present invention has been made in view of the above circumstances, and it is an object thereof to provide an electronic apparatus, a control method, and a program to perform control of operating states properly by person detection.

The present invention has been made to solve the above problem, and there is provided an electronic apparatus according to the first aspect of the present invention, which includes a processing unit which executes system processing, an object detection unit which detects an object present within a predetermined detection range and an operation control unit which controls the system processing according to a detection state detected by the object detection unit to make a transition to a first operating state or a second operating state in which at least part of the system processing is more limited than that in the first operating state, where when a transition from the first operating state to the second operating state is made regardless of the detection state detected by the object detection unit, the operation control unit prohibits the transition to the first operating state according to the detection state detected by the object detection unit.

In the above electronic apparatus, when the transition from the first operating state to the second operating state is made due to a user's instruction, the operation control unit may prohibit the transition to the first operating state according to the detection state detected by the object detection unit. In the above electronic apparatus, when prohibiting the transition to the first operating state, the operation control unit may make a transition from the second operating state to the first operating state according to a user's instruction.

The above electronic apparatus may also be configured such that the object detection unit detects a first detection state in which an object is being detected within the predetermined detection range, a second detection state in which the object is no longer detected after the object is being detected within the predetermined detection range, a third detection state in which the object is detected after the object is not detected within the predetermined detection range, and a fourth detection state in which the transition from the first operating state to the second operating state is detected in the first detection state regardless of the detection state, and the operation control unit makes the transition from the first operating state to the second operating state when the detection state by the object detection unit makes a transition from the first detection state to the second detection state, makes a transition from the second operating state to the first operating state when the detection state by the object detection unit makes a transition from the second detection state to the third detection state, continues the first operating state when the detection state by the object detection unit is the first detection state, and prohibits the transition to the first operating state according to the detection state when the detection state makes a transition from the first detection state to the fourth detection state.

In the above electronic apparatus, when the transition from the first detection state to the fourth detection state is made, the operation control unit may make the object detection unit keep the fourth detection state even when the object is no longer detected after the object is being detected within the predetermined detection range. In the above electronic apparatus, when a first condition unrelated to the detected detection state is satisfied in the fourth detection state, the object detection unit may make a transition from the fourth detection state to the first detection state. In the above electronic apparatus, the first condition may include making a transition from the second operating state to the first operating state due to a user's instruction. In the above electronic apparatus, when a second condition is satisfied in the fourth detection state, the object detection unit may make a transition from the fourth detection state to the second detection state. In the above electronic apparatus, when a third condition is satisfied in the fourth detection state, the object detection unit may make a transition from the fourth detection state to the third detection state.

The above electronic apparatus may further be configured such that the processing unit executes the system processing on the basis of face authentication processing based on a face image of a person, and when the transition from the first operating state to the second operating state is made according to the detection state detected by the object detection unit, the face authentication processing is enabled, while when the transition from the first operating state to the second operating state is made regardless of the detection state detected by the object detection unit, the face authentication processing is stopped or disabled.

Further, according to the second aspect of the present invention, there is provided a control method for an electronic apparatus including a processing unit which executes system processing, the control method including: a detection step of causing an object detection unit to detect an object present within a predetermined detection range; and an operation control step of causing an operation control unit to control the system processing according to a detection state detected by the object detection unit to make a transition to a first operating state or a second operating state in which at least part of the system processing is more limited than that in the first operating state, wherein when a transition from the first operating state to the second operating state is made regardless of the detection state detected by the object detection unit, the transition to the first operating state is prohibited in the operation control step according to the detection state detected by the object detection unit.

Further, according to the third aspect of the present invention, there is provided a program for an electronic apparatus including a processing unit which executes system processing, the program causing a computer as the electronic apparatus to execute: a detection step of detecting an object present within a predetermined detection range; and an operation control step of controlling the system processing according to a detection state detected in the detection step to make a transition to a first operating state or a second operating state in which at least part of the system processing is more limited than that in the first operating state, wherein when a transition from the first operating state to the second operating state is made regardless of the detection state detected in the detection step, the transition to the first operating state is prohibited in the operation control step according to the detection state detected in the detection step.

The above aspects of the present invention can perform control of operating states properly by person detection. The above aspects of the present invention can perform control of operating states properly by person detection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
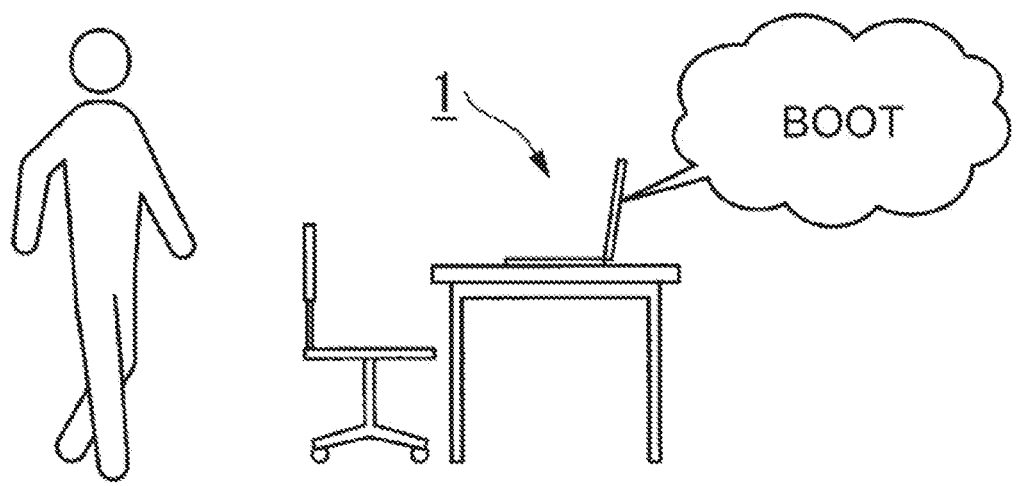
FIG. 1A is a schematic block diagram illustrating an electronic apparatus in a boot state as a person approaches according to an embodiment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "unit" or "system." Furthermore, embodiments may take the form of a program product embodied in one or more computer readable storage devices storing machine readable a code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as units, in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be implemented in code and/or software for execution by various types of processors. An identified unit of code may, for instance, comprise one or more physical or logical blocks of executable code which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of code may be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different computer readable storage devices. Where a unit or portions of a unit are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software units, user selections, network transactions, database queries, database structures, hardware units, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a unit, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Some embodiments of the present invention will be described below with reference to the accompanying drawings. An electronic apparatus 1 according to the embodiment is, for example, a laptop Personal Computer (PC). Note that the electronic apparatus 1 may be an electronic apparatus of any other type, such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the Advanced Configuration and Power Interface (ACPI) specification. The standby state is a state in which at least part of system processing is limited. For example, the standby state is a state in which at least the display of a display unit appears to be OFF (screen OFF), i.e., an operating state lower in power consumption than the normal operating state. The standby state may be the standby state or a sleep state, or a state corresponding to modern standby in Windows® or S3 state (sleep state) defined in the ACPI specification. Further, the standby state may include a hibernation state or a power-off state. The hibernation state corresponds, for example, to S4 state defined in the ACPI specification. The power-off state corresponds, for example, to S5 state (shutdown state) defined in the ACPI specification.

In the following, a transition of the system operating state from the standby state to the normal operating state may be called a "boot." In the standby state, since the activation level is generally lower than the normal operating state, the boot of the system of the electronic apparatus 1 to start system processing leads to the activation of the operation of the system processing in the electronic apparatus 1.

Figure 1B:
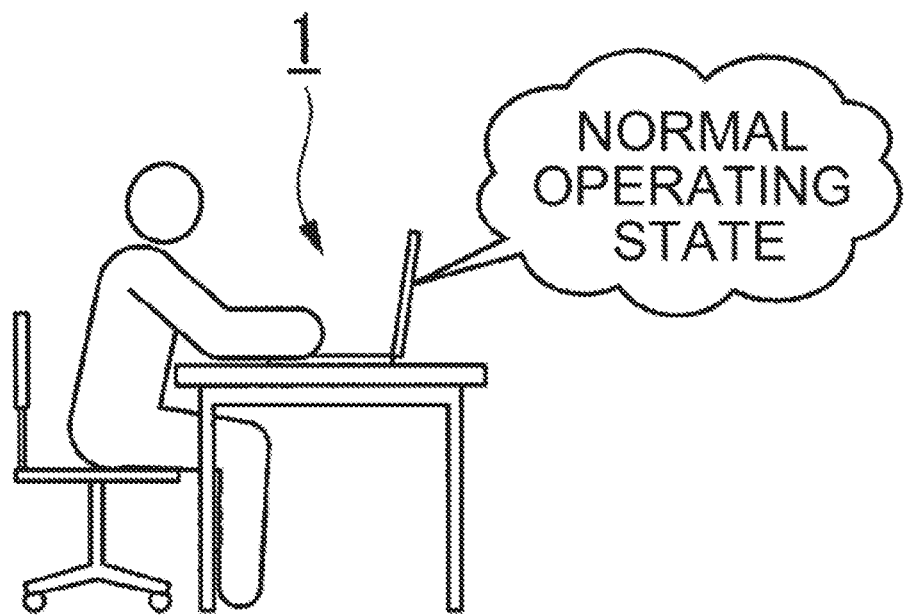
FIG. 1B is a schematic block diagram illustrating the electronic apparatus in a normal operating state as a person is working according to an embodiment.
Figure 1C:
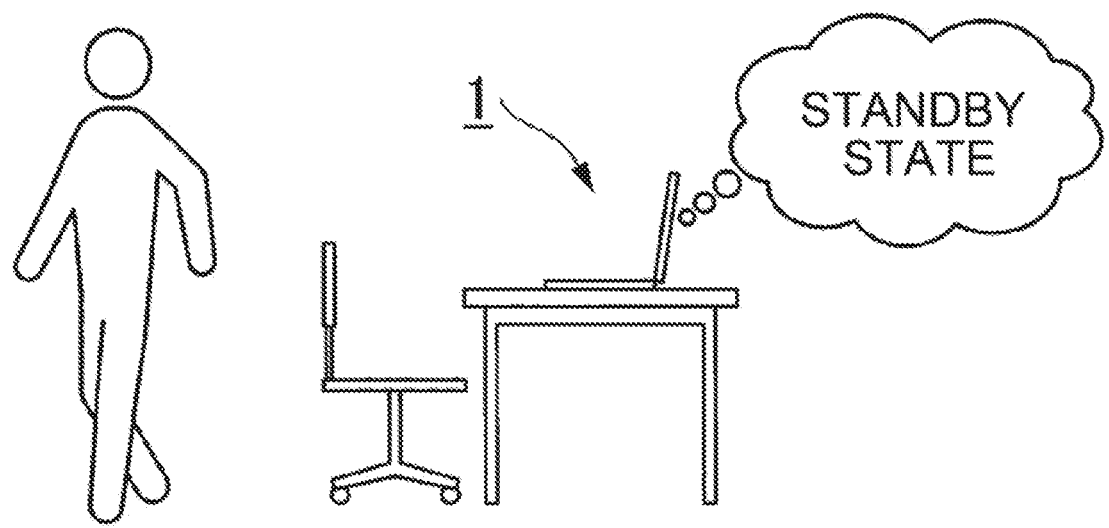
FIG. 1C is a schematic block diagram illustrating the electronic apparatus in a standby state as a person leaves according to an embodiment.

FIG. 1A is a schematic block diagram illustrating an electronic apparatus 1 in a boot state as a person approaches according to an embodiment. FIG. 1B is a schematic block diagram illustrating the electronic apparatus 1 in a normal operating state as a person is working according to an embodiment. FIG. 1C is a schematic block diagram illustrating the electronic apparatus 1 in a standby state as a person leaves according to an embodiment.

The electronic apparatus 1 includes a proximity sensor to be described later to detect a person present in the vicinity of the electronic apparatus 1. This processing for detecting the presence of a person may also be called HPD (Human Presence Detection) processing. The electronic apparatus 1 detects a person present in the vicinity of the electronic apparatus 1 to control the operating state of the electronic apparatus 1 based on the detection result. For example, as illustrated in FIG. 1A, when detecting that a person approaches the electronic apparatus 1 ("Approach"), the electronic apparatus 1 automatically boots the system to start the system processing. Further, as illustrated in FIG. 1B, in a state where the person is present in front of the electronic apparatus 1 ("Presence"), the electronic apparatus 1 causes the system processing to be limited so as not to make a transition to the standby state, and continues the normal operating state. Then, as illustrated in FIG. 1C, when detecting that the person leaves the electronic apparatus 1 ("Leave"), the electronic apparatus 1 causes the system processing to make a transition to the standby state.

External Structure of Electronic Apparatus

Figure 2:
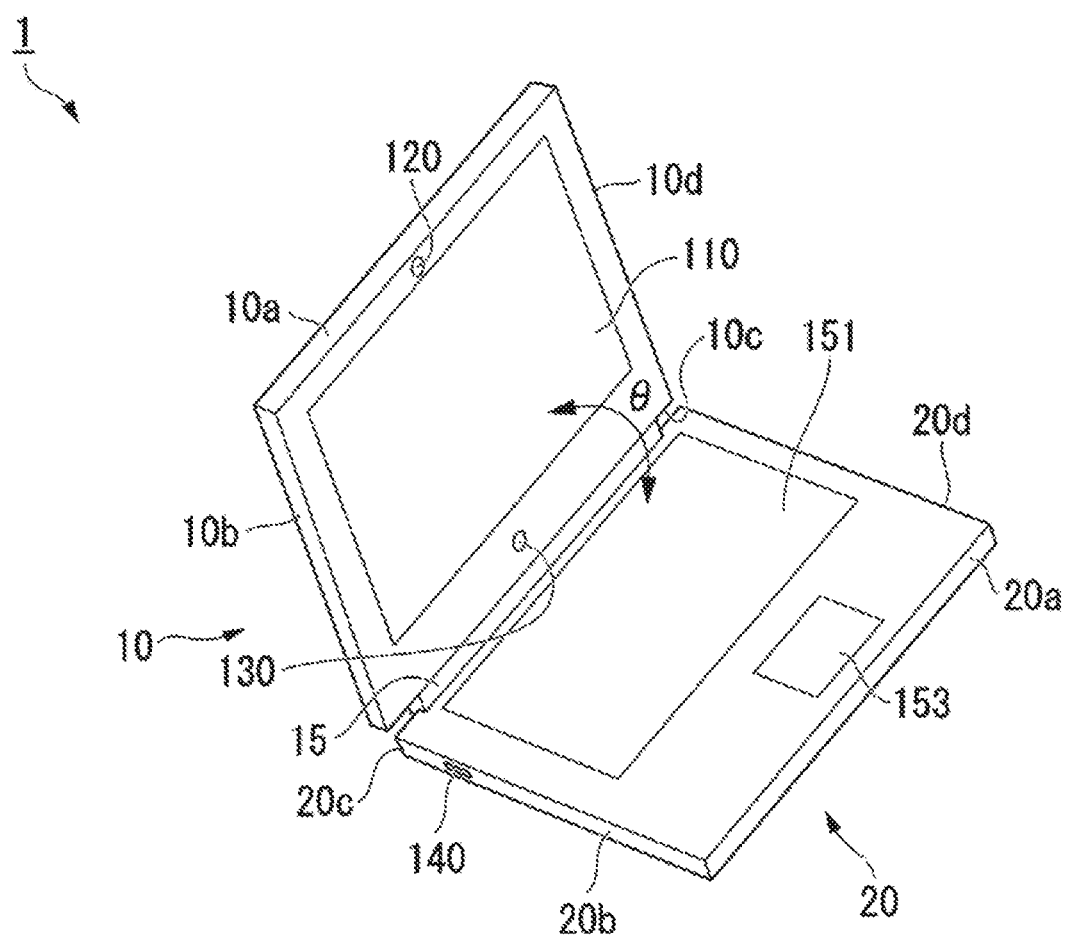
FIG. 2 is a perspective view illustrating an external structure example of the electronic apparatus according to the embodiment.

FIG. 2 is a perspective view illustrating an external structure example of the electronic apparatus 1 according to the embodiment. The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called "A" cover or a display chassis. The second chassis 20 is also called "C" cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In FIG. 2, the direction from the side face 20a to the side face 20c is referred to as "back," and the direction from the side face 20c to the side face 20a is referred to as "front." The right hand and left hand in the backward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0π) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open is referred to as an "open state."

The external appearance of the electronic apparatus 1 in FIG. 2 illustrates an example of the open state. The open state is a state where the side face 10a of the first chassis 10 and the side face 20a of the second chassis 20 are separated. In the open state, the inner faces of the first chassis 10 and the second chassis 20 appear so that the electronic apparatus 1 will be expected to be able to carry out normal operation. The open state is a state where the open angle θ between the inner face of the first chassis 10 and the inner face of the second chassis 20 is equal to or more than a predetermined angle, typically about 1000 to 1300. The range of open angles θ to be open state can be set arbitrarily according to the range of angles rotatable by the hinge mechanism 15, or the like.

A display unit 110 is provided on the inner face of the first chassis 10. The display unit 110 is configured to include a liquid crystal display (LCD), an organic EL (Electro Luminescence) display, or the like. Further, an imaging unit 120 and a proximity sensor 130 are provided in a peripheral area of the display unit 110 on the inner face of the first chassis 10. The imaging unit 120 is arranged on the side of the side face 20a in the peripheral area of the display unit 110. The proximity sensor 130 is arranged on the side of the side face 20c in the peripheral area of the display unit 110.

In the open state, the imaging unit 120 captures an image of an object within a predetermined angle of view in a direction (front) to face the inner face of the first chassis 10. The predetermined angle of view is an imaging angle of view defined by an imaging element included in the imaging unit 120 and an optical lens provided in front of an imaging surface of the imaging element.

The proximity sensor 130 detects an object (for example, a person) present in the vicinity of the electronic apparatus 1. For example, the proximity sensor 130 is an infrared distance sensor configured to include a light-emitting part for emitting infrared light and a light-receiving part for receiving reflected light which is the infrared light returned after being emitted and reflected on the surface of the object. The proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light or a ToF (Time of Flight) method for converting, to a distance, a time difference from light-emitting to light-receiving, or the like.

Figure 3:
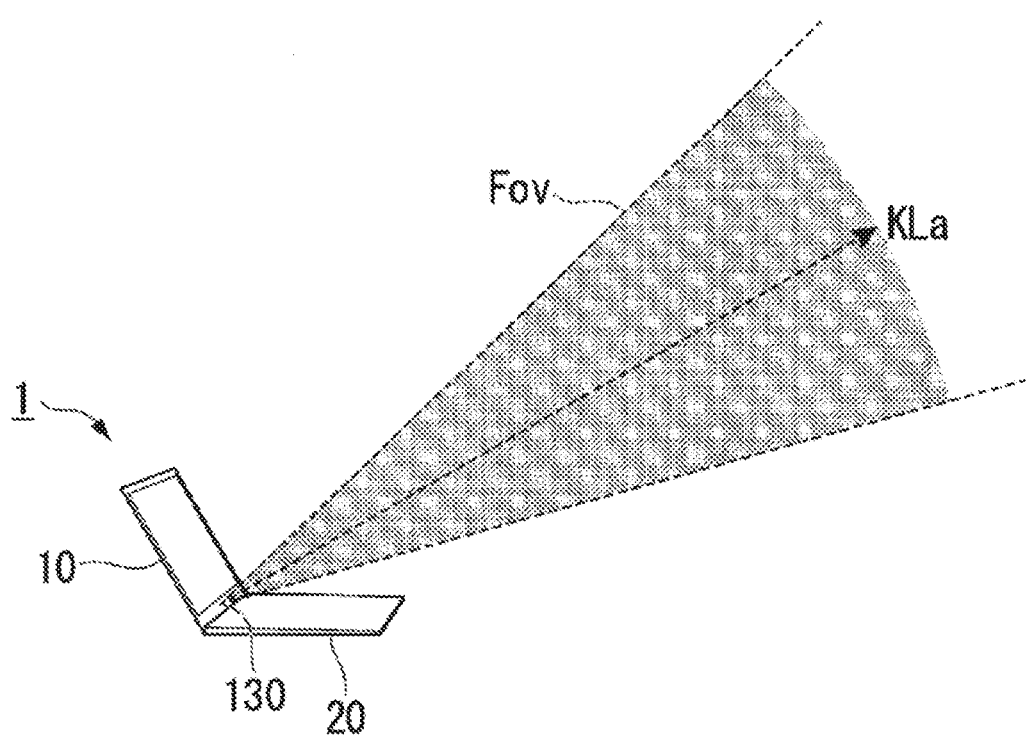
FIG. 3 is a schematic diagram illustrating a sensor detection range of a proximity sensor according to the embodiment.

FIG. 3 is a schematic diagram illustrating a sensor detection range of the proximity sensor 130. In the open state, the proximity sensor 130 arranged on the inner face of the first chassis 10 detects an object (for example, a person) in a direction (front) to face the inner face of the first chassis 10. A detection field of view FoV indicates an angle detectable by the proximity sensor 130. A detection limit distance KLa indicates a limit distance detectable by the proximity sensor 130. A range defined by this detection field of view FoV (for example, 25° to 30°) and the detection limit distance KLa (for example, 120 cm), in some embodiments, is the sensor detection range detectable by the proximity sensor 130.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and may be a sensor using any other method, such as an ultrasonic sensor or a sensor using an UWB (Ultra Wide Band) radar, as long as the sensor detects a distance to the object.

Returning to FIG. 2, a power button 140 is provided on the side face 20b of the second chassis 20. The power button 140 is an operating element used by a user to give instructions of booting the system (making a transition from the standby state to the normal operating state) and making a transition from the normal operating state to the standby state. Further, a keyboard 151 and a touch pad 153 are provided as an input device on the inner face of the second chassis 20. Note that a touch sensor may be included as the input device instead of or in addition to the keyboard 151 and the touch pad 153, and a mouse and an external keyboard may also be connected. When the touch sensor is provided, an area corresponding to the display surface of the display unit 110 may be configured as a touch panel for accepting operations. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling their functions. In the state where the first chassis 10 and the second chassis 20 are completely closed, the open angle θ is 0°.

Hardware Configuration of Electronic Apparatus

Figure 4:
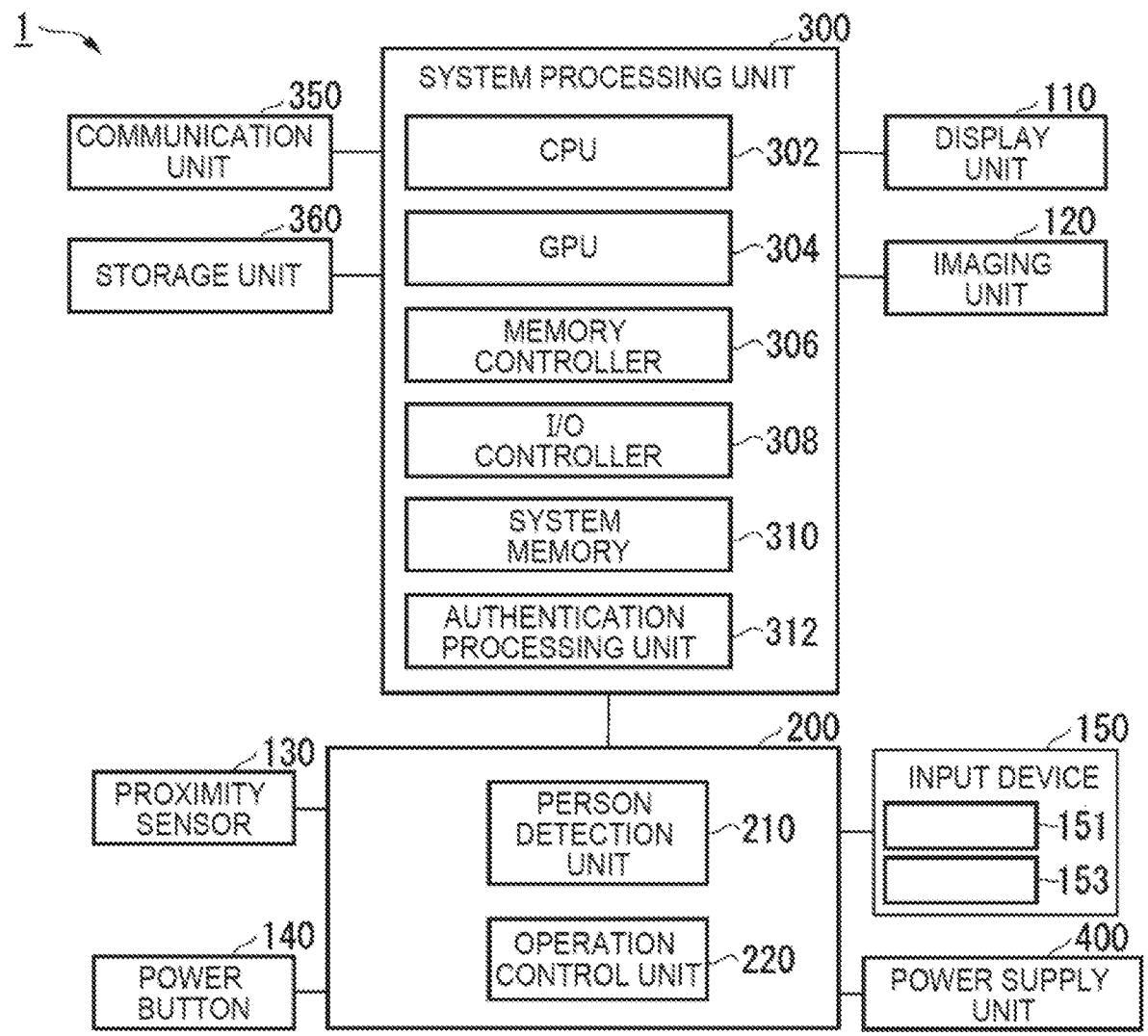
FIG. 4 is a schematic block diagram illustrating a hardware configuration example of the electronic apparatus according to the embodiment.

FIG. 4 is a schematic block diagram illustrating a hardware configuration example of the electronic apparatus 1 according to the embodiment. The electronic apparatus 1 is configured to include the display unit 110, the imaging unit 120, the proximity sensor 130, the power button 140, an input device 150, an EC (Embedded Controller) 200, a system processing unit 300, a communication unit 350, a storage unit 360, and a power supply unit 400. The display unit 110 displays display data generated by system processing executed by the system processing unit 300.

The imaging unit 120 captures an image of an object within a predetermined angle of view in a direction (front) to face the inner face of the first chassis 10, and outputs the captured image to the system processing unit 300. For example, when the face of a person approaching the electronic apparatus 1 is contained within the angle of view of the imaging unit 120, the imaging unit 120 captures a face image of the person, and outputs the captured face image to the system processing unit 300. The imaging unit 120 may be an infrared camera or a normal camera. The infrared camera is a camera including an infrared sensor as an imaging element. The normal camera is a camera including, as an imaging element, a visible light sensor for receiving visible light.

The proximity sensor 130 detects an object (for example, a person) present in a direction (front) to face the inner face of the first chassis 10, and outputs, to the EC 200, a detection signal indicative of the detection result. The power button 140 outputs, to the EC 200, operation signals according to user's operations.

The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit. The power supply unit 400, in some embodiments, includes a DC (Direct Current)/DC converter. The DC/DC converter converts, the voltage of DC power, supplied from an AC (Alternating Current)/DC adapter or a battery pack, to voltage required for each unit. The power with the voltage converted by the DC/DC converter is supplied to each unit through each power system. For example, the power supply unit 400 supplies power to each unit through each power system based on a control signal according to the operating state of each unit input from the EC 200. Other power supply units 400 may be configured differently.

The EC 200, in some embodiments, is a microcomputer configured to include a CPU (Central Processing Unit), a RAM (Random Access Memory), a ROM (Read Only Memory), an I/O (Input/Output) logic circuit, and the like. The CPU of the EC 200 reads a control program prestored in the ROM thereof and executes the read control program to fulfill the function. In some embodiments, the EC 200 operates independently of the system processing unit 300 to control the operation of the system processing unit 300 and manage the operating state of the system processing unit 300. The EC 200, in some embodiments, is connected to the proximity sensor 130, the input device 150, and the power supply unit 400.

For example, the EC 200 acquires, from the proximity sensor 130, a detection signal indicative of the detection result to control the operating state of the system processing unit 300 based on the detection result. Further, the EC 200, in some embodiments, communicates with the power supply unit 400 to acquire information on a battery state (remaining battery capacity, and the like) from the power supply unit 400 and output, to the power supply unit 400, a control signal or the like in order to control the supply of power according to the operating state of each unit of the electronic apparatus 1. Further, the EC 200 acquires, in some embodiments, operation signals from the input device 150, and outputs, to the system processing unit 300, an operation signal related to processing of the system processing unit 300 among the acquired operation signals.

Further, the EC 200, in some embodiments, acquires an operation signal from the power button 140, and outputs, to the system processing unit 300, a control signal to make a transition of the operating state of the system processing to the normal operating state or the standby state based on the operation signal. In some examples, in the standby state, when acquiring an operation signal indicating that the power button 140 is held down, the EC 200 outputs a control signal (boot signal) for instructing the system to start the system processing. In other embodiments, in the normal operating state, when acquiring the operation signal indicating that the power button 140 is held down, the EC 200 outputs a control signal to make a transition of the operating state of the system processing from the normal operating state to the standby state. More specifically, in other examples, when acquiring an operation signal indicating that the power button 140 is held down for a time shorter than a predetermined time in the normal operating state, the EC 200 may output a control signal to make a transition of the operating state of the system processing to a sleep state, while when acquiring an operation signal indicating that the power button 140 is held down for a time longer than the predetermined time (long-press operation), the EC 200 may output a control signal to make a transition of the operating state of the system processing to a shutdown state.

Further, as a functional configuration related to the HPD processing, the EC 200 includes a person detection unit 210 and an operation control unit 220. Based on the detection signal acquired from the proximity sensor 130, the person detection unit 210 detects an object (for example, a person) present within a predetermined detection range. In the following description, the fact that the person detection unit 210 detects an object (for example, a person) may be simply called that a person is detected. In other words, the fact that the person detection unit 210 detects a person includes both that the person detection unit 210 detects a person and that the person detection unit 210 detects an object other than the person. In some examples, based on the detection result detected by the proximity sensor 130 with a predetermined sampling frequency (for example, 1 Hz), the person detection unit 210 detects a person present within the predetermined detection range in front of the electronic apparatus 1.

The predetermined detection range is a person detection range set as a range in which the person detection unit 210 detects a person. In some embodiments, the person detection range is a range defined by the detection angle of view indicative of the angle of view as a detection target and the maximum detection distance indicative of the distance as a detection target. For example, the person detection range corresponds to the sensor detection range of the proximity sensor 130. Specifically, for example, the detection angle of view in the person detection range corresponds to the detection angle of view FoV (see FIG. 3) of the proximity sensor 130. Further, for example, the maximum detection distance in the person detection range corresponds to the detection limit distance KLa (see FIG. 3) of the proximity sensor 130. Note that the person detection range may be such that a limitation on the maximum detection distance or the minimum detection distance is set as part of the sensor detection range of the proximity sensor 130. In other words, the person detection unit 210 may set, as the person detection range, a preset part of the sensor detection range of the proximity sensor 130. Based on the detection signal acquired from the proximity sensor 130, the person detection unit 210 may also detect the distance to a person present within a predetermined range in front of the electronic apparatus 1. In other embodiments, the person detection range is set to a range less than a range in which the person detection unit 210 detects a person.

Further, the person detection unit 210 detects a first detection state where a person is being detected within the person detection range (that is, a state where a person is present in front of the electronic apparatus 1: "Presence"), a second detection state where the person is no longer detected after the person is being detected within the person detection range (that is, a state where the person leaves the electronic apparatus 1: "Leave"), and a third detection state where the person is detected after no person is detected within the person detection range (that is, a state where the person approaches the electronic apparatus 1: "Approach").

The apparatus of FIG. 4 is one example a hardware configuration example of the electronic apparatus 1. Other configurations may implement various embodiments where the apparatus 1 includes a person detection unit 210 that interacts with a proximity sensor 130, a power button 140, input devices 150, an imaging unit 120, etc.

Figure 5:
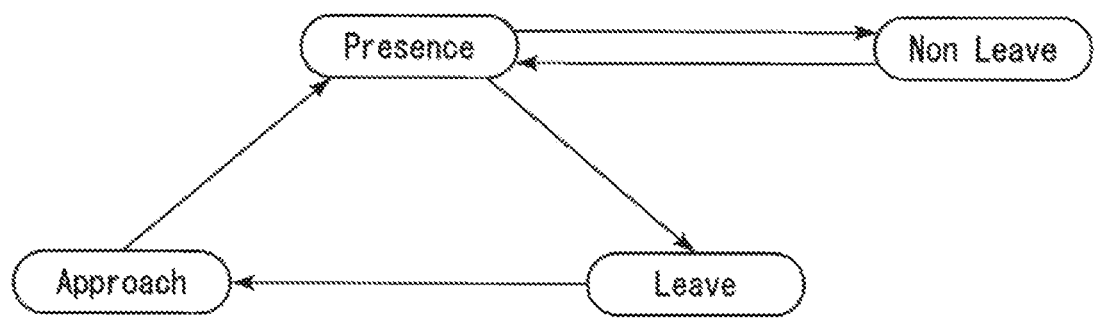
FIG. 5 is a transition diagram of detection states by a person detection unit according to the embodiment.

FIG. 5 is a transition diagram of detection states by the person detection unit 210 according to the embodiment. When detecting a person after no person is detected within the person detection range ("Leave"), the person detection unit 210 determines that the person approaches in front of the electronic apparatus 1 to make a transition of the detection state from "Leave" to "Approach." Further, when continuously detecting the person within the person detection range after the person is detected, the person detection unit 210 determines that the person is present in front of the electronic apparatus 1 to cause a transition of the detection state from "Approach" to "Presence." Further, when no longer detecting the person after the person is being detected within the person detection range ("Presence"), the person detection unit 210 determines that the person present in front of the electronic apparatus 1 has left to cause a transition of the detection state from "Presence" to "Leave."

In the state where the person is being detected within the person detection range ("Presence"), the person detection unit 210 also detects a fourth detection state where the system processing is caused to make a transition from the normal operating state to the standby state due to an instruction from the user. Note that the normal operating state may be a first operating state and the standby state may be a second operating state. The expression "due to the instruction from the user" is, for example, when an instruction with a user's operation to make a transition to the standby state is accepted by using a function of the OS, when the power button of the electronic apparatus 1 is held down, or the like. The fourth detection state is a state where no transition to "Leave" is made even when the person is no longer detected, which is called "Non Leave" here. When making a transition from "Presence" to "Non Leave," the person detection unit 210 continues "Non Leave" without making a transition to "Leave" even when the person is no longer detected after the person is being detected within the person detection range. Therefore, when the transition to "Non Leave" is made, the person detection unit 210 continues "Non Leave" without making transitions to both "Approach" and "Presence" even when the person is detected within the person detection range. On the other hand, when the system is booted to start system processing due to the instruction from the user after the transition to "Non Leave," the person detection unit 210 makes a transition (returns) from "Non Leave" to "Presence."

Returning to FIG. 4, when the person detection unit 210 makes the transition of the detection state from "Leave" to "Approach" mentioned above, the operation control unit 220 starts the system processing in the standby state to make a transition to the normal operating state. More specifically, when the system is booted to start the system processing by the system processing unit 300, the operation control unit 220 outputs a control signal to the power supply unit 400 to supply power necessary for the operation of each unit of the electronic apparatus 1. After that, the operation control unit 220 outputs a boot signal to the system processing unit 300 to instruct the system processing unit 300 to boot the system so as to start the system processing. When acquiring the boot signal, the system processing unit 300 starts the system processing to make the transition to the normal operating state.

Further, when the detection state by the person detection unit 210 is "Presence," the operation control unit 220 restricts the system not to make a transition to the standby state so as to continue the normal operating state. However, even when the person detection unit 210 continues to detect the person within the person detection range, the operation control unit 220 may make the transition from normal operating state to the standby state depending on a predetermined condition (for example, when the duration of non-operation has lasted for a preset period of time).

Further, depending on the detection state detected by the person detection unit 210, the operation control unit 220 controls the system processing to the normal operating state or the standby state. When the detection state by the person detection unit 210 makes a transition from "Presence" to "Leave," the operation control unit 220 makes a transition from the normal operating state to the standby state. More specifically, the operation control unit 220 outputs a standby signal to the system processing unit 300 to give an instruction to cause the system processing to make the transition from the normal operating state to the standby state. When acquiring the standby signal, the system processing unit 300 causes the system processing to make the transition from the normal operating state to the standby state. After that, the operation control unit 220 outputs a control signal to the power supply unit 400 to stop the supply of power unnecessary in the standby state.

Further, when the detection state detected by the person detection unit 210 is "Non Leave," the operation control unit 220 prohibits the transition to the normal operating state according to the detection state detected by the person detection unit 210. In other words, when the transition from the normal operating state to the standby state is made due to the instruction from the user, the operation control unit 220 prohibits the transition to the normal operating state according to the detection state detected by the person detection unit 210.

The system processing unit 300 is configured to include a CPU 302, a GPU (Graphic Processing Unit) 304, a memory controller 306, an I/O (Input-Output) controller 308, a system memory 310, and an authentication processing unit 312, where processes of various application software are executable on an OS (Operating System) by system processing based on the OS. The CPU 302 and the GPU 304 may be collectively called a processor.

As described above, the transition can be made at least between the normal operating state (power-on state), which may be called a first operating state, and the standby state as system operating states. Standby states include the standby state, a sleep state, a hibernation state, and a power-off state. Standby states may also be called a second operating state.

The standby state is an operating state in which the processing power of the processor is made lower than that in the normal operating state to make the power consumption of the peripheral devices, such as the communication unit 350, the storage unit 360, and the display unit 110, lower than those in the normal operating state while holding the contents of the working system memory 310.

The sleep state is an operating mode in which the supply of power to devices other than the system memory 310, the EC 200, and devices subordinate to the system memory 310 and the EC 200 is stopped without execution of programs by the processor.

The hibernation state is a mode in which all pieces of information stored in the system memory 310 are saved to an auxiliary storage device accessible immediately from the processor in the sleep state, and after that, the supply of power to the system memory 310 is further stopped. Therefore, when boot processing is started from the hibernation state, the CPU 302 stores, in the system memory 310, the information saved in the auxiliary storage device. The power-off state is a state in which the supply of power to devices other than the EC 200 and devices subordinate to the EC 200 is stopped.

The CPU 302 makes a transition of the system operating state by the HPD processing performed by the EC 200 based on the detection result of the proximity sensor 130. For example, when the operating state is the standby state and the boot signal is input from the EC 200, the CPU 302 makes a transition from the standby state to the normal operating state. For example, in the case where the operating state is the sleep state, the hibernation state, or the power-off state, when power is supplied from the power supply unit 400 and the boot signal is input from the EC 200, the CPU 302 starts boot processing. In the boot processing, the CPU 302 detects and initializes the minimum devices such as the system memory 310 and the storage unit 360 (pre-boot). The CPU 302 loads system firmware from the storage unit 360 into the system memory 310 to detect and initialize the other devices such as the communication unit 350 and the display unit 110 (post-processing). Initialization includes processing such as initial parameter settings. In a transition (resume) from the sleep state to the normal operating state, part of the post-processing may be omitted. After completion of the boot processing, the CPU 302 starts execution of the system processing by the OS (boot). For example, when the operating state is the standby state and the boot signal is input from the EC 200, the CPU 302 resumes execution of an application program(s) the execution of which has been stopped.

When the execution of the system processing by the OS is started, the CPU 302 executes login processing before allowing access to the OS, and the execution of the following system processing is paused until login is allowed in login authentication processing. The login authentication processing is user authentication processing for determining whether the person using the electronic apparatus 1 is a preregistered, authorized user or not. As the login authentication, there are password authentication, face authentication, fingerprint authentication, and the like. Here, an example of using face authentication processing will be described. The CPU 302 instructs the authentication processing unit 312 to execute the face authentication processing based on a face image of the person captured by the imaging unit 120. When the authentication result by the authentication processing unit 312 is successful, the CPU 302 allows the login and resumes the execution of the paused system processing. On the other hand, when the authentication result by the authentication processing unit 312 is unsuccessful, the login is not allowed and the execution of the system processing is left stopped.

In addition to making a transition of the operating state by the HPD processing described above, the CPU 302 also makes the transition of the operating state as OS processing. For example, in the standby state, when the power button of the electronic apparatus 1 is held down with a user's operation or when an operation to the keyboard 151 or the touch pad 153 is performed, the CPU 302 starts the system processing to make a transition to the normal state. Further, in the normal state, when an instruction to make a transition to the standby state is accepted by using the function of the OS with a user's operation or when the power button of the electronic apparatus 1 is held down, the CPU 302 causes the system processing to make a transition to the standby state.

Further, when the duration of non-operation has lasted for a preset period of time in the normal operating state, the CPU 302 makes a transition from the normal operating state to the standby state by the OS processing. The preset period of time is a threshold value for determining the transition to the standby state when the duration of non-operation has lasted, which is settable in the OS system settings. For example, when the duration of non-operation has lasted, there are options such as "screen OFF time" to determine a transition to a state where the display of the display unit 110 is turned OFF (screen OFF), "sleep time" to determine a transition to the sleep state, and the like, and the user can select and set an option arbitrarily from among these options. In addition to time options (for example, "one minute," "two minutes," "four minutes," "ten minutes," "half-hour," "one hour," . . . ), a setting of prohibiting the transition to screen OFF or a setting of prohibiting the transition to the sleep state (for example, "none"), and the like are included in the options.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be allocated between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304. The I/O controller 308 controls input/output of data from the communication unit 350, the display unit 110, and the EC 200.

The system memory 310 is used as a reading area of an execution program of the processor and a working area to write processed data.

When receiving an instruction to execute face authentication processing from the CPU 302, the authentication processing unit 312 executes the face authentication processing based on a face image of a person captured by the imaging unit 120. The face image of the person captured by the imaging unit 120 is the face image of a person who approaches from the front of the electronic apparatus 1. The face authentication processing includes face detection processing and face matching processing. The face detection processing is processing for defining a face area as an area of a face from an image signal input from the imaging unit 120. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in with the account. The authentication information includes image feature values of the face image of the user. The authentication information is stored in further association with user information indicating the user. The user information may be information capable of identifying the user of the electronic apparatus 1, such as a user name, a user ID (Identifier), or the like.

As a result of matching the face image of the person captured by the imaging unit 120 with the authentication information on the set user, when it can be determined to match with each other, the authentication processing unit 312 determines that the face authentication is successful. On the other hand, for example, when a person other than the person using the electronic apparatus 1 cuts across in front of the electronic apparatus 1 by chance, the authentication processing unit 312 detects no face area from the image captured by the imaging unit 120. The authentication processing unit 312 outputs, to the CPU 302 and the EC 200, authentication information indicative of success/failure of the face authentication.

The communication unit 350 is connected to other devices communicably through a wireless or wired communication network to send and receive various data. For example, the communication unit 350 is configured to include a wired LAN interface such as the Ethernet (registered trademark), a wireless LAN interface such as Wi-Fi (registered trademark), and the like. Note that the communication unit 350 may also be configured to include a USB (Universal Serial Bus) interface, a Bluetooth (registered trademark) interface, etc.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

Next, the operation of processing according to the embodiment will be described.

Operation of Boot Processing Upon Detection of Approach of Person

Figure 6:
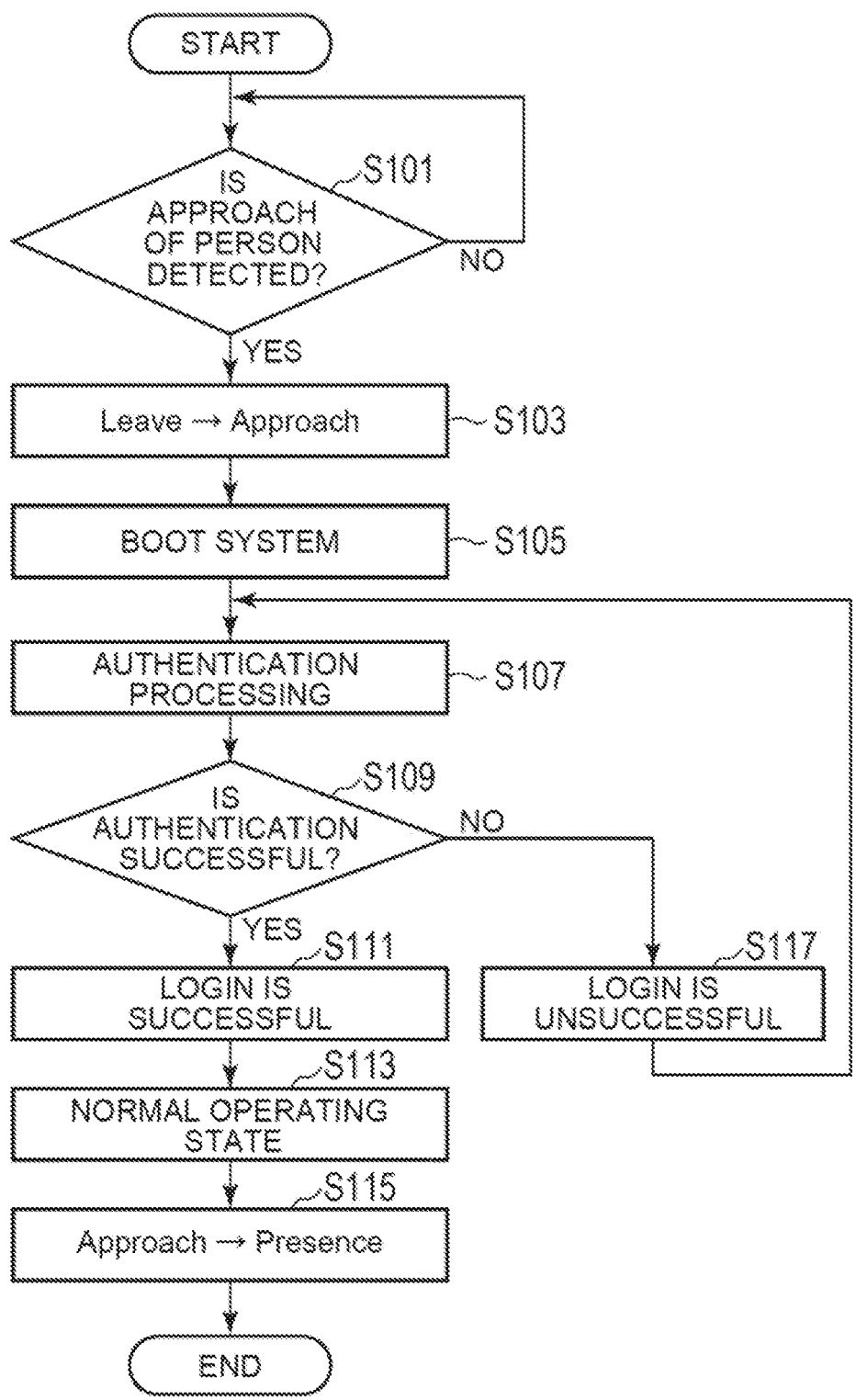
FIG. 6 is a schematic flow chart diagram illustrating an example of boot control according to the embodiment.

First, the operation of boot processing to start the system processing performed when the electronic apparatus 1 detects the approach of a person will be described. FIG. 6 is a flowchart illustrating an example of boot control according to the embodiment. Here, it is assumed that the electronic apparatus 1 is placed open on a desk or the like in the standby state.

(Step S101) Based on a detection signal acquired from the proximity sensor 130, the person detection unit 210 determines whether the approach of a person to the electronic apparatus 1 is detected or not. When a person is detected after no person is detected within the person detection range, the person detection unit 210 determines that the approach of a person to the electronic apparatus 1 is detected. When no person remains detected within the person detection range, the person detection unit 210 determines that the approach of a person to the electronic apparatus 1 is not detected. Then, when determining that the approach of a person to the electronic apparatus 1 is not detected (NO), the person detection unit 210 performs processing in step S101 again. On the other hand, when determining that the approach of a person to the electronic apparatus 1 is detected (YES), the person detection unit 210 proceeds to processing in step S103.

(Step S103) The person detection unit 210 causes the detection state to make a transition from "Leave" to "Approach." Then, the procedure proceeds to processing in step S105.

(Step S105) The operation control unit 220 boots the system to start system processing by the system processing unit 300. Specifically, when starting the system processing by the system processing unit 300, the operation control unit 220 outputs, to the power supply unit 400, the control signal to supply power necessary for the operation of each unit of the electronic apparatus 1. Further, the operation control unit 220 outputs the boot signal to instruct the CPU 302 to start the system processing. When acquiring the boot signal, the CPU 302 starts boot processing. Then, the procedure proceeds to processing in step S107.

(Step S107) The CPU 302 executes the login processing. For example, the CPU 302 executes the login processing by face authentication using a face image of a person captured by the imaging unit 120. Specifically, the CPU 302 instructs the authentication processing unit 312 to execute face authentication processing based on the face image of the person captured by the imaging unit 120, and acquires the authentication result from the authentication processing unit 312. Then, the procedure proceeds to processing in step S109.

(Step S109) The CPU 302 determines whether the authentication result is successful or not. When the authentication result is successful (YES), the CPU 302 proceeds to processing in step S111. On the other hand, when the authentication result is unsuccessful (NO), the CPU 302 proceeds to processing in step S117.

(Step S111) The CPU 302 outputs a notification that the login is successful (for example, displays the notification on the display unit 110) when the authentication result is successful to continue the boot processing. Then, the procedure proceeds to processing in step S113.

(Step S113) The CPU 302 ends the boot processing and makes a transition to the normal operating state. Then, the procedure proceeds to processing in step S115.

(Step S115) The person detection unit 210 causes the detection state to make a transition from "Approach" to "Presence."

(Step S117) The CPU 302 outputs a notification that the login is unsuccessful (for example, displays the notification on the display unit 110) when the authentication result is unsuccessful to return to the authentication processing in step S107. When the authentication processing is unsuccessful continuously a predetermined number of times, the CPU 302 may stop the authentication processing and make a transition to a state of disabling the execution of the login authentication processing.

Operation of Standby State Transition Processing Upon Detection of Leave of Person Next, the operation of standby state transition processing to cause the system processing to make a transition from the normal operating state to the standby state when the leave of a person from the electronic apparatus 1 is detected will be described.

Figure 7:
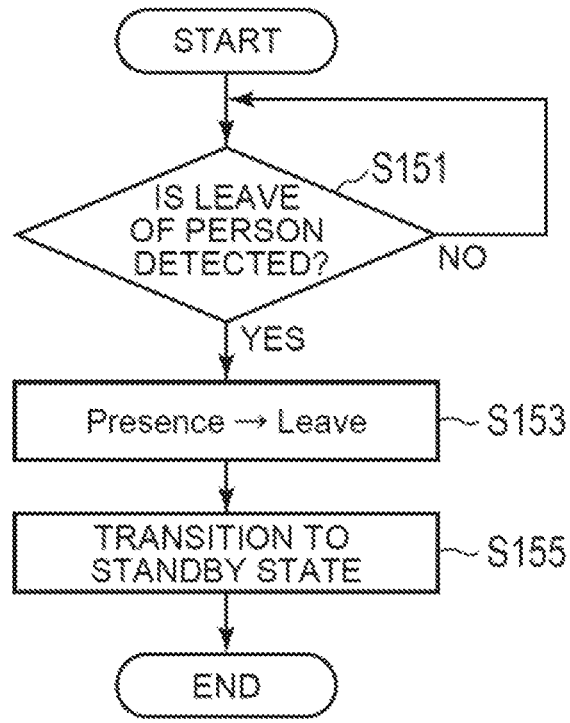
FIG. 7 is a schematic flow chart diagram illustrating an example of standby state transition processing according to the embodiment.

FIG. 7 is a flowchart illustrating an example of standby state transition processing according to the embodiment. Here, it is assumed that the electronic apparatus 1 is placed open on the desk or the like in the normal operating state.

(Step S151) Based on the detection signal acquired from the proximity sensor 130, the person detection unit 210 determines whether the leave of a person from the electronic apparatus 1 is detected or not. For example, when a person is no longer detected after the person is being detected within the person detection range, the person detection unit 210 determines that the leave of the person from the electronic apparatus 1 is detected. On the other hand, when the person remains detected within the person detection range, the person detection unit 210 determines that the leave of the person from the electronic apparatus 1 is not detected. Then, when the leave of the person from the electronic apparatus 1 is not detected (NO), the person detection unit 210 performs processing in step S151 again. On the other hand, when the leave of the person from the electronic apparatus 1 is detected (YES), the person detection unit 210 proceeds to processing in step S153.

(Step S153) The person detection unit 210 causes the detection state to make a transition from "Presence" to "Leave." Then, the procedure proceeds to processing in step S155.

(Step S155) The operation control unit 220 causes the system processing by the system processing unit 300 to make a transition from the normal operating state to the standby state. Specifically, the operation control unit 220 outputs a standby signal to instruct the CPU 302 to cause the system processing to make the transition to the standby state. When acquiring the standby signal, the CPU 302 makes the transition from the normal operating state to the standby state. Further, the operation control unit 220 outputs, to the power supply unit 400, the control signal to stop the supply of power unnecessary in the standby state.

Operation of Standby State Transition Processing by User's Instruction

Next, the operation of standby state transition processing to cause the system processing to make a transition from the normal operating state to the standby state by a user's instruction will be described.

Figure 8:
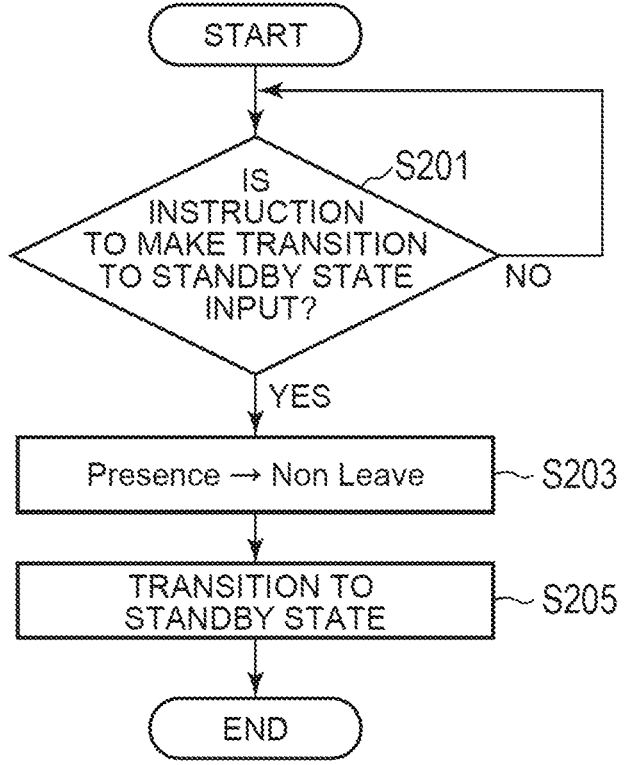
FIG. 8 is a schematic flow chart diagram illustrating an example of standby state transition processing by a user's instruction according to the embodiment.

FIG. 8 is a flowchart illustrating an example of standby state transition processing by a user's instruction according to the embodiment. Here, it is assumed that the electronic apparatus 1 is placed open on the desk or the like in the normal operating state.

(Step S201) The person detection unit 210 determines whether an instruction to make a transition to the standby state is input with a user's operation or not. For example, when the instruction to make the transition to the standby state with the user's operation is accepted by using the function of the OS, or when the power button of the electronic apparatus 1 is held down, the person detection unit 210 determines that the instruction to make the transition to the standby state is input. In other embodiments, the user may select a standby option from a menu. Then, when determining that the instruction to make the transition to the standby state is not input with the user's operation (NO), the person detection unit 210 performs processing in step S201 again. On the other hand, when determining that the instruction to make the transition to the standby state is input with the user's operation (YES), the person detection unit 210 proceeds to processing in step S203.

(Step S203) The person detection unit 210 causes the detection state to make a transition from "Presence" to "Non Leave." Then, the procedure proceeds to processing in step S205.

(Step S205) The operation control unit 220 causes the system processing by the system processing unit 300 to make the transition from the normal operating state to the standby state. Specifically, the operation control unit 220 outputs a standby signal to instruct the CPU 302 to cause the system processing to make the transition to the standby state. When acquiring the standby signal, the CPU 302 makes the transition from the normal operating state to the standby state. Further, the operation control unit 220 outputs, to the power supply unit 400, the control signal to stop the supply of power unnecessary in the standby state.

Figure 9:
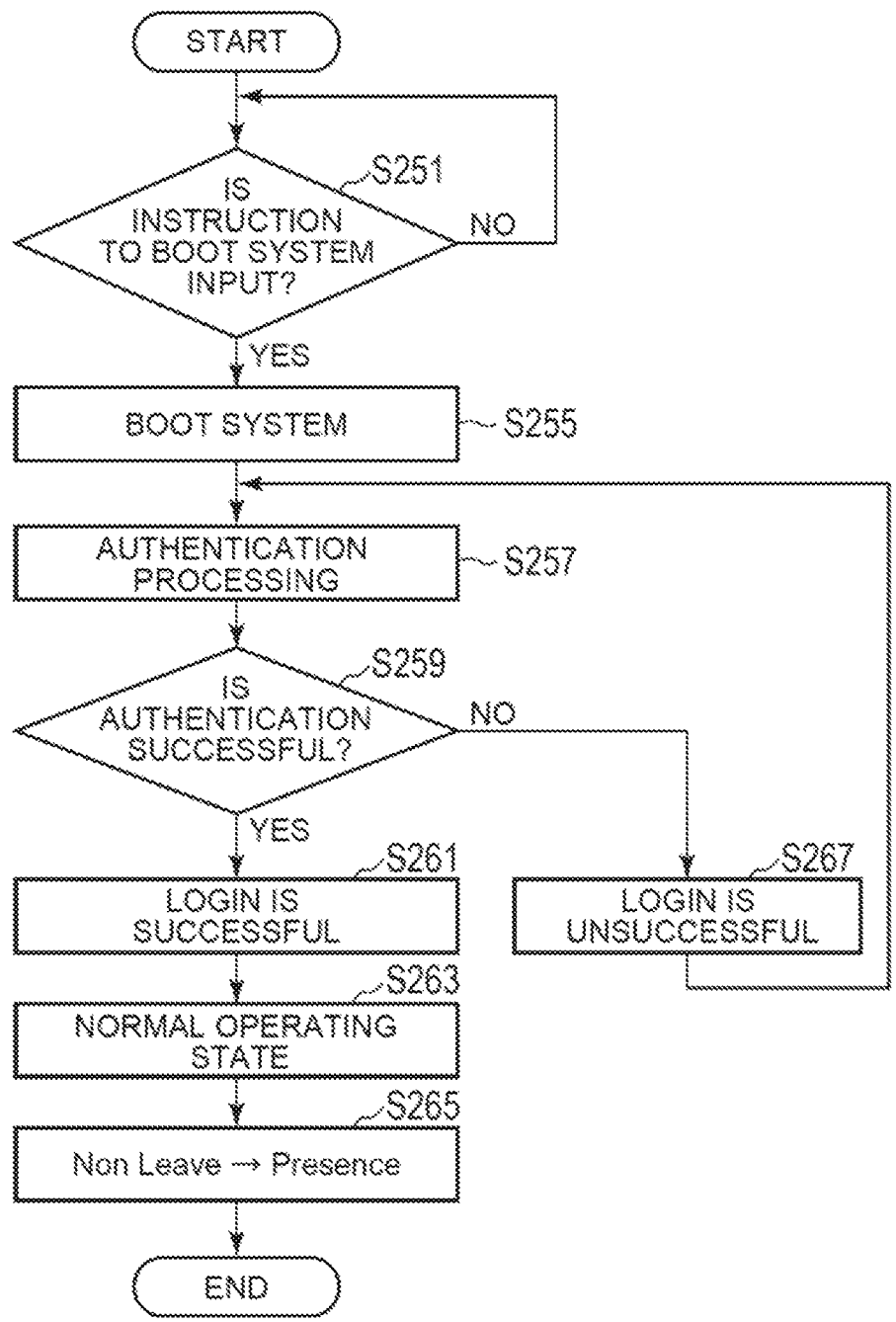
FIG. 9 is a schematic flow chart diagram illustrating an example of boot control at the time of "Non Leave" according to the embodiment.

Operation of Boot Processing after Transition to Standby State by User's Instruction Next, the operation of boot processing to start the system processing after the transition to the standby state in response to the user's instruction in the standby state transition processing of FIG. 8, that is, in the case of "Non Leave" will be described. FIG. 9 is a flowchart illustrating an example of boot control at the time of "Non Leave" according to the embodiment.

(Step S251) The person detection unit 210 determines whether the instruction to make the transition to the standby state is input with the user's operation or not. For example, when the instruction to make the transition to the standby state with the user's operation is accepted by using the function of the OS, or when the power button of the electronic apparatus 1 is held down, the person detection unit 210 determines that the instruction to make the transition to the standby state is input. Then, when determining that the instruction to make the transition to the standby state is not input with the user's operation (NO), the person detection unit 210 performs processing in step S251 again. On the other hand, when determining that the instruction to make the transition to the standby state is input with the user's operation (YES), the person detection unit 210 proceeds to processing in step S255.

Since the following processing steps S255, S257, S259, S261, S263, and S267 correspond to processing steps S105, S107, S109, S111, S113, and S117 in FIG. 6, the description thereof is omitted. In step S263, when the CPU 302 ends the boot processing and the transition to the normal operating state is made, the procedure proceeds to processing in step S265.

(Step S265) The person detection unit 210 causes the detection state to make a transition from "Non Leave" to "Presence."

As described above, in the electronic apparatus 1 according to the embodiment, the system processing unit 300 (an example of a processing unit) executes system processing. The person detection unit 210 (an example of an object detection unit) detects an object (for example, a person) present within the person detection range (an example of a predetermined detection range). The operation control unit 220 controls the system processing depending on the detection state detected by the person detection unit 210 to cause the system processing to make a transition to the normal operating state (an example of a first operating state), or to the standby state (an example of a second operating state) in which at least part of the system processing is more limited than that in the normal operating state. Further, when the operation control unit 220 makes the transition from the normal operating state to the standby state due to the user's instruction, the transition to the normal operating state is prohibited according to the detection state detected by the person detection unit 210. Thus, the electronic apparatus 1 can prevent the detection of a person to boot the system despite the fact that the transition to the standby state is made at the user's own discretion.

Note that the operation control unit 220 may make the transition from the normal operating state to the standby state when the duration of non-operation has lasted for a preset period of time. Even in this case, the transition to the normal operating state according to the detection state detected by the person detection unit 210 may be prohibited. Thus, the electronic apparatus 1 can prevent the detection of a person to boot the system despite the fact that the transition to the standby state is made for the reason that the user is not using the electronic apparatus.

When the transition from the normal operating state to the standby state is made regardless of the detection state detected by the person detection unit 210, the operation control unit 220 prohibits the transition to the normal operating state according to the detection state detected by the person detection unit 210. Thus, for example, when the user is not willing to use the electronic apparatus 1 in a state where the user does not leave the electronic apparatus 1 or when the transition to the standby state is made due to the fact that the electronic apparatus 1 is left unused, the electronic apparatus 1 can prevent the detection of the user present in front of the electronic apparatus 1 to boot the electronic apparatus 1. Therefore, the electronic apparatus 1 can control the operating state by the detection of a person properly.

Further, when prohibiting the transition to the normal operating state, the operation control unit 220 makes a transition from the standby state to the normal operating state according to a user's instruction. Thus, when the user is willing to use the electronic apparatus, the electronic apparatus 1 can make the transition to the normal operating state.

For example, the person detection unit 210 detects the first detection state ("Presence") in which a person is being detected within the person detection range, the second detection state ("Leave") in which the person is no longer detected after the person is being detected within the person detection range, the third detection state ("Approach") in which a person is detected after no person is detected within the person detection range, and the fourth detection state ("Non Leave") in which the transition from the normal operating state to the standby state is detected regardless of the detection state in the first detection state ("Presence").

When the detection state by the person detection unit 210 makes a transition from the first detection state to the second detection state, the operation control unit 220 makes the transition from the normal operating state to the standby state. Further, when the detection state by the person detection unit 210 makes a transition from the second detection state to the third detection state, the operation control unit 220 makes the transition from the standby state to the normal operating state, while when the detection state by the person detection unit 210 remains in the first detection state, the operation control unit 220 continues the normal operating state. Further, when a transition from the "Presence" to the fourth detection state "Non Leave" is made, the operation control unit 220 prohibits the transition to the normal operating state according to the detection state.

Thus, when the transition from the normal operating state to the standby state is made regardless of the detection state detected by the person detection unit 210, the electronic apparatus 1 can prevent the detection of the user present in front of the electronic apparatus 1 to boot the electronic apparatus 1.

Further, when the transition from "Presence" to "Non Leave" is made, the person detection unit 210 will not make a transition to "Leave" even if the person is no longer detected after the person is being detected within the person detection range. That is, when the transition from "Presence" to "Non Leave" is made, the operation control unit 220 will make the person detection unit 210 keep "Non Leave" even if the person is no longer detected after the person is being detected within the person detection range.

When the transition from the normal operating state to the standby state is made regardless of the detection state detected by the person detection unit 210, the electronic apparatus 1 can cause the detection state not to make the transition to "Leave" so as not to make a transition to "Approach." Thus, the electronic apparatus 1 can be prevented from being booted. Note that, when the transition to "Non Leave" is made, the person detection unit 210 may stop the processing for detecting a person. For example, when the detection state of the person detection unit 210 makes the transition to "Non Leave," the detection processing by the proximity sensor 130 may be stopped to reduce power consumption.

Further, when the detection state of the person detection unit 210 makes the transition to "Non Leave," the face authentication processing by the authentication processing unit 312 may be stopped or disabled. For example, when the system processing is caused to make the transition to the standby state in response to the fact that the detection state of the person detection unit 210 makes the transition to "Leave," the face authentication processing by the authentication processing unit 312 can be enabled in the standby state to enable the start of the system processing by face authentication. In this case, even when the face authentication processing by the authentication processing unit 312 is enabled in the state of "Leave," the system processing unit 300 can stop or disable the face authentication processing in the state of "Non Leave" to prevent the start of the system processing against user's will. In other words, when the transition from the normal operating state to the standby state is made according to the detection state detected by the person detection unit 210, the system processing unit 300 may enable the face authentication processing, while when the transition from the normal operating state to the standby state is made regardless of the detection state detected by the person detection unit 210, the system processing unit 300 may stop or disable the face authentication processing.

Further, in the case of "Non Leave," when a first condition unrelated to the detected detection state is satisfied, the person detection unit 210 makes a transition from "Non Leave" to "Presence." Here, for example, the first condition means making a transition from the standby state to the normal operating state due to a user's instruction.

Thus, when the transition from the standby state to the normal operating state is made due to the user's instruction, since the detection state by the person detection unit 21 returns to "Presence" again, the electronic apparatus 1 can control the operating state of the system processing after that according to the HPD processing.

In the case of "Non Leave," the person detection unit 210 may make a transition from "Non Leave" to "Leave" when a second condition is satisfied. Here, for example, the second condition is a condition capable of determining the leave of the user from the electronic apparatus 1 without doubt. The condition capable of determining the leave of the user from the electronic apparatus 1 without doubt is, for example, such a condition that the elapsed time after the person is no longer detected within the person detection range by the person detection unit 210 exceeds a preset period of time (for example, 15 minutes or more), such a condition that the person detection range is sufficiently wide and the user goes away a preset distance or more (for example, 10 m or more) from the electronic apparatus 1, or the like.

When the function of near field communication such as Bluetooth (registered trademark) is usable in the standby state, the second condition may be such a condition that the received signal strength from a device connected to the electronic apparatus 1 through the communication becomes a predetermined value or less. Further, the second condition may be such a condition that a microphone equipped in the electronic apparatus 1 no longer detects sound (or that the level of detected sound becomes a predetermined value or less). The microphone may also be an external microphone connected to the electronic apparatus 1 wirelessly or by wire. Further, the second condition may be such a condition that the illumination of a room in which the electronic apparatus 1 is placed, which is detected by an illuminance sensor, becomes a predetermined value or less. The illuminance sensor may be equipped in the electronic apparatus 1, or provided in the room separately from the electronic apparatus 1 in a manner connectable to the electronic apparatus 1.

Thus, even when the transition from the normal operating state to the standby state is made regardless of the detection state detected by the person detection unit 210, the electronic apparatus 1 can cause the detection state to make the transition from "Non Leave" to "Leave" if the leave of the user can be determined without doubt to control the operating state of the system processing according to the HPD processing after that.

Further, in the case of "Non Leave," when a third condition is satisfied, the person detection unit 210 may make a transition from "Non Leave" to "Approach." Here, the third condition is a condition capable of determining that the distance from the electronic apparatus 1 to the person (user) is decreased. For example, in the case of "Non Leave," when it is detected that the distance to the person gets closer, the person detection unit 210 may make a transition from "Non Leave" to "Approach."

Thus, even when the transition from the normal operating state to the standby state is made regardless of the detection state detected by the person detection unit 210, if it can be determined that the user has pulled the electronic apparatus 1 close to the user or that the user has come close to the electronic apparatus 1, the electronic apparatus 1 can cause the detection state to make a transition from "Non Leave" to "Approach" to start the system processing in order to control the operating state of the system processing according to the HPD processing after that. For example, determining that the user has pulled the electronic apparatus 1 close may include a distance where the user is capable of touching the electronic apparatus 1, is capable of input via a keyboard, mouse, touchpad, etc. In some examples, the person detection unit 210 may transition the electronic apparatus 1 to from the standby state to the normal operating state using facial recognition or other authentication method different from user input via a keyboard, mouse, touchpad, etc.

While the embodiment of this invention has been described in detail above with reference to the accompanying drawings, the specific configuration is not limited to that in the above-described embodiment, and design changes and the like are included without departing from the scope of this invention. For example, the respective components described in the above-described embodiment can be combined arbitrarily.

Further, in the aforementioned embodiment, the example in which the detection state makes the transition from "Presence" to "Non Leave" when the transition from the normal operating state to the standby state is made regardless of the detection state detected by the person detection unit 210 has been described, but the detection state may remain in "Presence" not to make transitions from "Presence" to "Leave" and "Approach" instead of making the transition to "Non Leave."

Further, in the aforementioned embodiment, the EC 200 configured to operate independently of the system processing unit 300 may be any processing unit such as a sensor hub or a chipset, or the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300. In some embodiments, the EC 200 is configured differently than depicted in FIG. 4 and may include some or different components than depicted in FIG. 4.

Note that the electronic apparatus 1 described above has a computer system therein. Then, a program for implementing the function of each component included in the electronic apparatus 1 described above may be recorded on a computer-readable recording medium so that the program recorded on this recording medium will be read into the computer system and executed to perform processing in each component included in the electronic apparatus 1 described above. Here, the fact that "the program recorded on the recording medium is read into the computer system and executed" includes installing the program on the computer system. Here, it is assumed that the "computer system" includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a portable medium like a flexible disk, a magneto-optical disk, a ROM, or a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiment may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiment is not limited to a PC, a tablet terminal, or a smartphone, and the present invention can be applied to a household electric appliance and a commercial electric appliance. As the household electric appliance, the present invention can be applied to a TV set, a refrigerator, a microwave oven, or the like, provided with a display unit. For example, ON/OFF control of the TV screen, or ON/OFF control of the screen of the display unit of the refrigerator, the microwave oven, or the like can be performed according to the approach or leave of a person. As the commercial electric appliance, the present invention can be applied to a vending machine, a multimedia station, or the like. For example, the operating state can be controlled according to the approach or leave of a person, such as ON/OFF control of the lighting of the vending machine or ON/OFF control of the screen of a display unit of the multimedia station.

Further, the aforementioned embodiment has been described by taking, as an example, the HPD processing for detecting a person to control the operation of the system processing, but person's gaze may be detected instead of the detection of a person. For example, a sensor for detecting person's gaze may be provided instead of the proximity sensor 130. In this case, a state where the direction of person's gaze is within a predetermined range of gaze directions including the direction to the electronic apparatus 1 corresponds to "Presence," a state where the direction of person's gaze changes from the direction within the predetermined range of gaze directions to a direction beyond the predetermined range of gaze directions corresponds to "Leave," and a state where the direction of person's gaze changes from the direction beyond the predetermined range of gaze directions to a direction within the range of gaze directions corresponds to "Approach." Thus, the electronic apparatus 1 can also detect person's gaze to control the operating state of the system so as to apply the processing of the embodiment.

DESCRIPTION OF SYMBOLS 1 electronic apparatus, 10 first chassis, 20 second chassis, 15 hinge mechanism, 110 display unit, 120 imaging unit, 130 proximity sensor, 140 power button, 150 input device, 151 keyboard, 153 touch pad, 200 EC, 210 person detection unit, 220 operation control unit, 300 system processing unit, 302 CPU, 304 GPU, 306 memory controller, 308 I/O controller, 310 system memory, 312 authentication processing unit, 350 communication unit, 360 storage unit, 400 power supply unit.

What is claimed is:

1. An electronic apparatus comprising:
a processing unit configured to execute system processing;
an object detection unit configured to detect an object present within a predetermined detection range; and
an operation control unit configured to control the system processing according to a detection state detected by the object detection unit to make a transition to one of a first operating state and a second operating state, wherein the second operating state comprises a standby state in which at least part of the system processing by the processing unit is more limited than that in the first operating state,
wherein when a transition from the first operating state to the second operating state is made regardless of the detection state detected by the object detection unit, the operation control unit prohibits the transition to the first operating state according to the detection state detected by the object detection unit.

2. The electronic apparatus according to claim 1, wherein when the transition from the first operating state to the second operating state is made due to a user's instruction, the operation control unit prohibits the transition to the first operating state according to the detection state detected by the object detection unit.

3. The electronic apparatus according to claim 2, wherein when prohibiting the transition to the first operating state, the operation control unit makes a transition from the second operating state to the first operating state according to a user's instruction.

4. The electronic apparatus according to claim 1, wherein the object detection unit is configured to detect a first detection state in which an object is being detected within the predetermined detection range, a second detection state in which the object is no longer detected after the object is being detected within the predetermined detection range, a third detection state in which the object is detected after the object is not detected within the predetermined detection range, and a fourth detection state in which the transition from the first operating state to the second operating state is detected in the first detection state regardless of the detection state, and
the operation control unit is configured to make the transition from the first operating state to the second operating state when the detection state by the object detection unit makes a transition from the first detection state to the second detection state, make a transition from the second operating state to the first operating state when the detection state by the object detection unit makes a transition from the second detection state to the third detection state, continue the first operating state when the detection state by the object detection unit is the first detection state, and prohibit the transition to the first operating state according to the detection state when the detection state makes a transition from the first detection state to the fourth detection state.

5. The electronic apparatus according to claim 4, wherein when the transition from the first detection state to the fourth detection state is made, the operation control unit makes the object detection unit keep the fourth detection state even when the object is no longer detected after the object is being detected within the predetermined detection range.

6. The electronic apparatus according to claim 5, wherein when a first condition unrelated to the detected detection state is satisfied in the fourth detection state, the object detection unit makes a transition from the fourth detection state to the first detection state.

7. The electronic apparatus according to claim 6, wherein the first condition comprises making a transition from the second operating state to the first operating state due to a user's instruction.

8. The electronic apparatus according to claim 7, wherein when a second condition is satisfied in the fourth detection state, the object detection unit makes a transition from the fourth detection state to the second detection state, wherein the second condition comprises determining a user leaving from the electronic apparatus without doubt.

9. The electronic apparatus according to claim 7, wherein when a third condition is satisfied in the fourth detection state, the object detection unit makes a transition from the fourth detection state to the third detection state, wherein the third condition comprises determining that a distance from the electronic apparatus to a user is decreased.

10. The electronic apparatus according to claim 1, wherein:
the processing unit is configured to execute the system processing on the basis of face authentication processing based on a face image of a person, and
when the transition from the first operating state to the second operating state is made according to the detection state detected by the object detection unit, the face authentication processing is enabled, while when the transition from the first operating state to the second operating state is made regardless of the detection state detected by the object detection unit, the face authentication processing is disabled.

11. A method comprising:
causing an object detection unit to detect an object present within a predetermined detection range, the object detection unit in an electronic apparatus comprising a processing unit executing system processing; and
causing an operation control unit to control the system processing according to a detection state detected by the object detection unit to make a transition to one of a first operating state and a second operating state, wherein the second operating state comprises a standby state in which at least part of the system processing by the processing unit is more limited than that in the first operating state,
wherein when a transition from the first operating state to the second operating state is made regardless of the detection state detected by the object detection unit, the transition to the first operating state is prohibited according to the detection state detected by the object detection unit.

12. The method of claim 11, wherein when the transition from the first operating state to the second operating state is made due to a user's instruction, the operation control unit prohibits the transition to the first operating state according to the detection state detected by the object detection unit, and wherein when prohibiting the transition to the first operating state, the operation control unit makes a transition from the second operating state to the first operating state according to a user's instruction.

13. The method of claim 11, further comprising:
detecting, by the object detection unit, a first detection state in which an object is being detected within the predetermined detection range, a second detection state in which the object is no longer detected after the object is being detected within the predetermined detection range, a third detection state in which the object is detected after the object is not detected within the predetermined detection range, and a fourth detection state in which the transition from the first operating state to the second operating state is detected in the first detection state regardless of the detection state, and
making, by the operation control unit, the transition from the first operating state to the second operating state when the detection state by the object detection unit makes a transition from the first detection state to the second detection state, making a transition from the second operating state to the first operating state when the detection state by the object detection unit makes a transition from the second detection state to the third detection state, continuing the first operating state when the detection state by the object detection unit is the first detection state, and prohibiting the transition to the first operating state according to the detection state when the detection state makes a transition from the first detection state to the fourth detection state.

14. The method of claim 13, wherein when the transition from the first detection state to the fourth detection state is made, the operation control unit makes the object detection unit keep the fourth detection state even when the object is no longer detected after the object is being detected within the predetermined detection range.

15. The method of claim 14, wherein:
when a first condition unrelated to the detected detection state is satisfied in the fourth detection state, the object detection unit makes a transition from the fourth detection state to the first detection state, wherein the first condition comprises making a transition from the second operating state to the first operating state due to a user's instruction;
when a second condition is satisfied in the fourth detection state, the object detection unit makes a transition from the fourth detection state to the second detection state, wherein the second condition comprises determining a user leaving from the electronic apparatus without doubt; and
when a third condition is satisfied in the fourth detection state, the object detection unit makes a transition from the fourth detection state to the third detection state, wherein the third condition comprises determining that a distance from the electronic apparatus to a user is decreased.

16. A program product comprising a computer readable storage medium that stores code executable by a processor, the executable code comprising code to:
detecting an object present within a predetermined detection range; and
controlling the system processing according to a detection state detected in the detection step to make a transition to one of a first operating state and a second operating state, wherein the second operating state comprises a standby state in which at least part of the system processing by the processing unit is more limited than that in the first operating state,
wherein when a transition from the first operating state to the second operating state is made regardless of the detection state detected in the detection step, the transition to the first operating state is prohibited in the operation control step according to the detection state detected in the detection step.

17. The program product of claim 16, wherein when the transition from the first operating state to the second operating state is made due to a user's instruction, the executable code further comprising code to prohibit the transition to the first operating state according to the detection state detected by the object detection unit, and wherein when prohibiting the transition to the first operating state, the executable code further comprising code to make a transition from the second operating state to the first operating state according to a user's instruction.

18. The program product of claim 16, the executable code further comprising code to:
detect a first detection state in which an object is being detected within the predetermined detection range, a second detection state in which the object is no longer detected after the object is being detected within the predetermined detection range, a third detection state in which the object is detected after the object is not detected within the predetermined detection range, and a fourth detection state in which the transition from the first operating state to the second operating state is detected in the first detection state regardless of the detection state, and
make the transition from the first operating state to the second operating state when the detection state makes a transition from the first detection state to the second detection state, make a transition from the second operating state to the first operating state when the detection state makes a transition from the second detection state to the third detection state, continue the first operating state when the detection state is the first detection state, and prohibit the transition to the first operating state according to the detection state when the detection state makes a transition from the first detection state to the fourth detection state.

19. The program product of claim 18, wherein when the transition from the first detection state to the fourth detection state is made, the operation control unit makes the object detection unit keep the fourth detection state even when the object is no longer detected after the object is being detected within the predetermined detection range.

20. The program product of claim 19, wherein:
when a first condition unrelated to the detected detection state is satisfied in the fourth detection state, the executable code comprises code to make a transition from the fourth detection state to the first detection state, wherein the first condition comprises making a transition from the second operating state to the first operating state due to a user's instruction;
when a second condition is satisfied in the fourth detection state, the executable code further comprises code to make a transition from the fourth detection state to the second detection state, wherein the second condition comprises determining a user leaving from the electronic apparatus without doubt; and when a third condition is satisfied in the fourth detection state, the executable code further comprises code to make a transition from the fourth detection state to the third detection state, wherein the third condition comprises determining that a distance from the electronic apparatus to a user is decreased.

\* \* \* \* \*